July 7, 1970 — R. E. VAN PATTEN — 3,519,012

LOW-RESPIRATORY VALVE

Filed Oct. 28, 1968 — 2 Sheets-Sheet 1

INVENTOR
ROBERT E. VAN PATTEN

BY Harry A. Herbert Jr.
Charles H. Wagner
ATTORNEYS

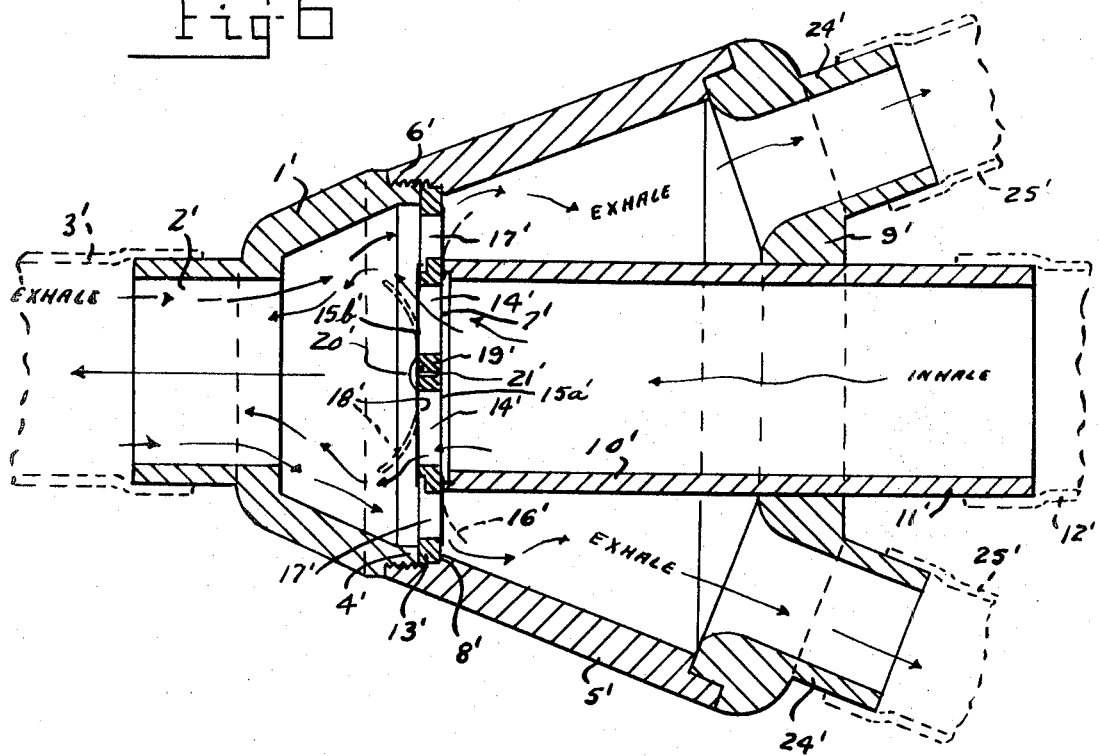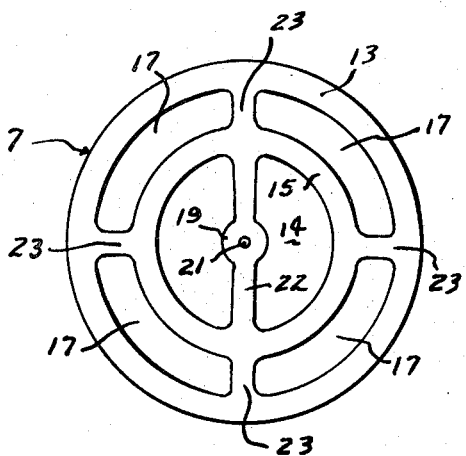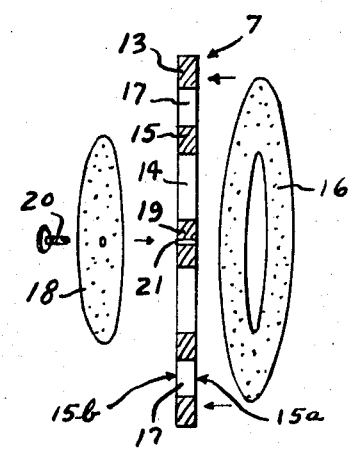

United States Patent Office 3,519,012
Patented July 7, 1970

3,519,012
LOW-RESPIRATORY VALVE
Robert E. Van Patten, Kettering, Ohio, assignor to the United States of America as represented by the Secretary of the Air Force
Filed Oct. 28, 1968, Ser. No. 771,184
Int. Cl. A62b 9/02
U.S. Cl. 137—102        8 Claims

ABSTRACT OF THE DISCLOSURE

A respiratory valve which is equipped with annular rubber-like leaflet intake and exhaust or expiration valves and which possesses the least possible "dead air" space. The valve uses colinear/coaxial valves and straight through flow patterns with oversized inlets and outlets to reduce the work of respiration during inhalation and exhalation to a minimum. The valve device includes a circular thin flexible rubber-like concentric inhalation valve fixed a its center on one side of a circular valve plate "spider" and the circular valve is fixed to the center of the plate and covers and controls the inhalation air port. A circular ring shaped thin flexible rubber-like flat exhalation valve is fixed around its inner circular perimeter to the other side of the valve plate spider and is flexible away from the plate upon exhalation and covers an annular outlet opening concentrically surrounding the inlet opening and has a circular concentric outlet or expiration port in the plate spider substantially equal to the inhalation port area that is covered and controlled by the inlet disk valve.

Background of the invention

In the conduct of medical studies of respiratory physiology, it is often necessary to collect separately inspired and exhaled gases of a person or subject in order to assess such parameters as oxygen consumption, flow rates and the like. For this purpose valve devices, generally known as respiratory valves, are commonly used. Such valves are usually equipped with intake and exhaust valves. These are usually of the rubber leaflet types. Commercially available valve devices commonly require ninety degree turns in flow paths which amount to an undesirable restriction. Valve areas are usually small compared to the dimensions of the respiratory inspiratory and expiratory conduits which amount to a further restriction, and pressure drop during the inspiration and expiration cycle.

While currently available conventional respiratory valves may be adequate for normal physiological investigations during conduct of which the human subjects are breathing normally, these valve devices which feature low dead air space volumes and small size valves are usually objectionally restrictive when used at maximum ventilatory flows, for instance such as would be encountered by an adult male subject when exercising to near exhaustion on a treadmill and the valve devices therefor cannot afford free and unobstructed or substantially maximum inhalation and exhalation. Therefore, during physiological deep and rapid breathing accurate investigation cannot be accomplished.

Summary of the invention

The invention is a valve device designed to offer the least possible restriction to air-flow in both directions therethrough and is primarily intended and useful for physiological studies in which the subject will be breathing very rapidly and deeply, to the limit of their capacities, while exercising vigorously over extended periods of time, and used to supply the patients with sufficient air, or oxygen without restriction during inhalation, for instance from a suitable container, and accommodate the discharge of the patient's breath during the exhalation cycle without restriction or back pressure, for collection, comparison and physiological studies thereof.

The valve device of the invention employs colinear/coaxial valves and flow passages with concentric inhalation and exhalation ports, and straight through flow patterns wtih oversize area inlet and outlet and valve ports, sufficient in area to reduce the work of respiration to the minimum obtainable and allow straight and full flow into and out of the subject's respiratory tract under all conditions, with no appreciable restrictions to flow, or back pressures.

Brief description of the drawings

Like reference characters refer to like parts in the several figures of the drawings.

FIG. 4 is a plan view of the inhalation and exhalation ported valve spider plate.

FIG. 5 is an exploded view showing the valve supporting spider plate in section and the concentric thin, flexible circular resilient inlet valve and the annular circular thin outlet or exhaust valve in perspective and spaced relation to the spider valve plate.

FIG. 6 is a longitudinal vertical sectional view similar to FIG. 1, but showing a modified form of housing to provide two or more exhalation conduits therefrom and greater exhale area surrounding the inhalation tube inside of the casing.

Figure 1:
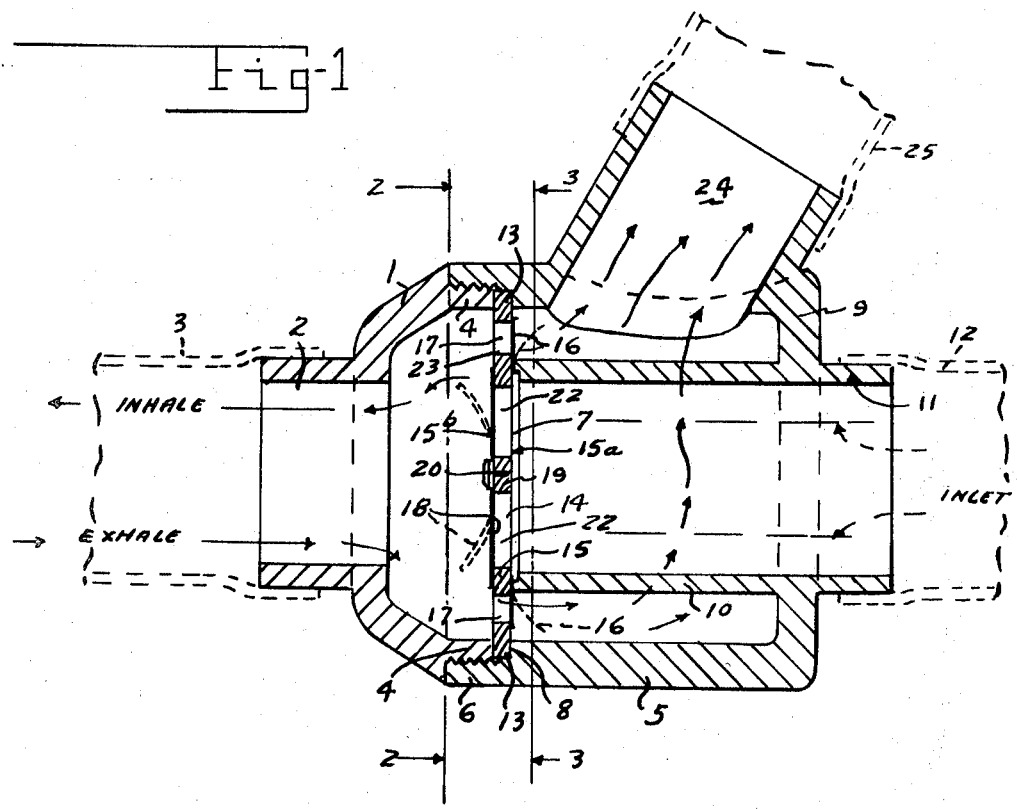
FIG. 1 is a longitudinal sectional view through a respiratory valve device for physiological studies, showing the valve members on the opposite sides of the valve plate spider in closed positions and showing the inlet valve and the exhale valve flexed in dotted lines to their open positions.
Figure 2:
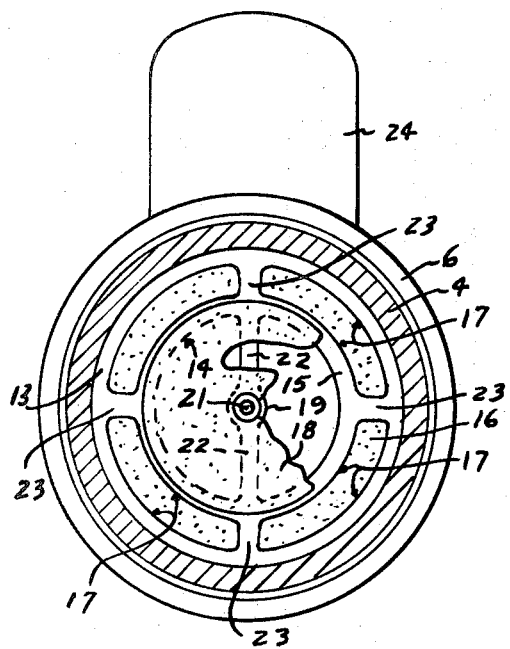
FIG. 2 is a transverse vertical sectional view, taken about on line 2—2 in FIG. 1 and looking in the direction of the arrows, part of the inhalation or inspiration valve broken away to show its inhalation port.
Figure 3:
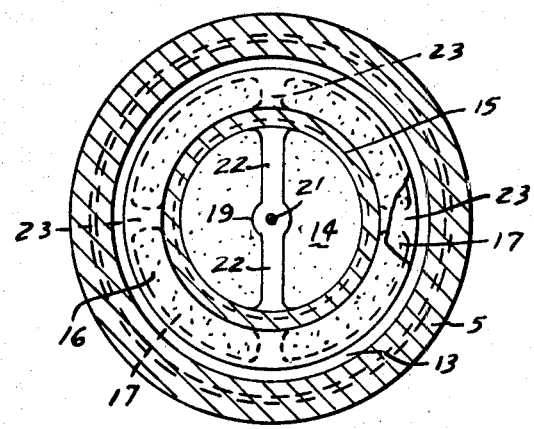
FIG. 3 is a similar sectional view taken about on line 3—3 in FIG. 1 and looking in the direction of the arrows, part of the exhalation or expiration valve being broken away to show part of its exhalation port in the valve spider plate.

Referring to the drawings, and more particularly to FIGS. 1 to 5, the reference numeral 1 denotes the front or cap portion of an annular or cylindrical casing 5. The cap 1 is formed with a tubular inhalation and exhalation mouthpiece 2 which is or may be connected by a flexible inhalation and exhalation conduit that is adapted to be connected to a patient's inhalation and exhalation mouthpiece or mask (not shown) for the patient to inhale and exhale therethrough.

The cap portion 1 is formed with an annular threaded extension 4 which is threadably received in an annular rear inhalation and exhalation casing 5 having an annular threaded extension 6 disposed or screwed into engagement with the threads of the annular extension 4, for drawing the casing 5 and the cap 1 together, as shown.

A valve supporting or "spider plate" indicated at 7 is securely clamped around its peripheral portion between an annular shoulder 8 formed in the casing 5 at the inner end of the threaded extension 6 and the outer end of the threaded portion 4 of the cap 1.

The cross-sectional area of the inside of the tubular mouthpiece 2 has a predetermined diameter which is sufficient to allow maximum and rapid lung inhalation and exhalation of any patient therethrough to the respiratory valve plate without retardation to flow or back pressure in the inhalation and exhalation of an adult male subject breathing through the valve device when exercising to near exhaustion, for instance, on a treadmill.

The annular casing 5 and the portion of the cap 1 adjacent the valve plate 7 are formed with predetermined internal diameter inhalation and exhalation openings to provide a cross-sectional area that is substantially twice, or greater than the cross sectional area of the tubular mouthpiece 2.

The casing 5 is closed by a wall 9 at its outer end and is formed with an inhalation conduit therethrough comprising an inhalation and valve clamping tubular member 10 which projects inwardly to the valve plate 7 and projects outwardly from the end wall 9 in concentric alignment to the tubular mouth piece 2, and has the same or substantially the same cross-sectional area as the tubular mouthpiece inhalation and exhalation conduit 2.

When it is desired to measure the quantity of air or oxygen supplied to the patient during breathing, this tubular portion 11 may be connected by a suitable similar size flexible conduit 12, which may be connected to a suitable oxygen or air supply container (not shown).

The valve plate or spider 7 is circular and is formed with an outer annular rim portion 13 that is clamped between the cap 1 and the casing 5 as shown in FIG. 1.

The spider or valve plate 7 is formed with a circular central inhalation port or opening 14 which is concentric with and aligned with the axes of the tubular members 2, 10 and 11, and is substantially the same cross-sectional area as that of the tubes 2, 10 and 11.

The opening 14 is surrounded by an annular or circular ring member 15 which constitutes means for clamping the thin rubber valve ring 16 around its inner edge between the outer face 15a of the valve plate 7 and the inner end of the tubular inlet or inhalation conduit 10.

An inner portion of the outer annular ring member 13 projects inwardly a short distance from the interior of the casing 5 and forms an annular seat for the periphery of the thin ring shape respiration outlet valve 16 to seat on, when closed during a patient's inspiration cycle.

The valve plate 7 is formed with an outer annular exhalation passage 17, between the outer ring and the central inhalation opening 14 of the plate which is closed by the ring shaped thin sheet rubber valve member 16 during the inhalation breathing cycle. The operative areas of the inhalation opening 14 in the valve plate 7 and the exhalation opening 17 in the plate are preferably equal and sufficiently large to provide maximum free inhalation and exhalation breathing by any patient under and circumstances.

The central or inhalation opening 14 in the plate 7 is also covered by a thin or sheet rubber disk valve member 18 which is secured to the opposite face 15b of the valve plate 7 on a small hub member 19 in any suitable manner, as by a fastening 20 which is secured in an opening 21 in the hub 19.

The hub member 19 is supported from the circular inner ring member 15 by suitable struts 22 and the periphery of the disk valve 18 seats on the ring member 15 on the side 15b of the plate 7 when the disk valve 18 is closed.

The ring member 15 is, in turn, supported by the outer ring 13 of the plate 7 by the struts 23.

The casing 5 is formed with a rewardly inclined enlarged tubular exhaust passage 24 opening out of the casing and has a cross sectional area preferably greater than the cross-sectional area and the other inhalation and exhalation passages 14 and 17, and may be connected to a suitable reservoir or container by a flexible hose 25, when it is desired to contain, analyze and measure the patient's exhaled breath.

Since the structure disclosed in FIG. 6 is substantially the same as that shown in FIGS. 1 to 5, the same reference characters are employed as in FIGS. 1 to 5, except that they are "primed."

This construction, like that in FIGS. 1 to 5, employs an unobstructed "straight through" inhalation passage comprising the inhalation and exhalation tubes 2′ and 10′ supported concentrically in the cap member 1′ and in the back wall 9′ of the casing 5′.

The casing 5′ is counterbored and threaded to receive the threaded extension 4′ of the cap 1′ and a shoulder 8′ provides an abutment for the inner face 15a′ of the circular inhalation and exhalation valve plate 7′.

The threaded extension 4′ of the cap 1′ clamps the outer ring 13′ of the valve or spider plate 7′ against the shoulder 8′ and clamps the inner edge of the thin circular exhalation ring shape flap valve 16′ between the face 15a′ and the inner end of the inhalation tube 10′. The ring shaped thin flap valve, like in FIGS. 1 to 5, closes the exhalation openings 17′ during the inhalation.

The valve plate 7′ carries the inhalation valve 18′ on the side 15b′ and closes the circular concentric inhalation port 14′ during exhalation.

The casing 5′, instead of being cylindrical like the casing 5, flares outwardly away from the valve plate 7′ to provide an enlarged exhalation chamber surrounding the inhalation tube 10′, and the annular rear wall 5′ is formed with two (or more) exhalation tubes 24′ discharging rearwardly, and having a greater cross-sectional area than the cross sectional area of the inhalation and exhalation tube 2′ to provide a substantially "straight through" exhalation or expiration passage from the plate 7′ through the valve device during exhalation breathing by a patient.

The areas of the inhalation and exhalation openings, 14′ and 17′, in the valve plate 7′ are about equal, as well as the cross sectional areas of the tubes 2′, 10′ and 11′ and sufficient to accommodate maximum inhalation and exhalation breathing by any patient without offering any restriction to the inhalation and exhalation and thus provide straight through breathing passages.

Where the tubular member 2′ is connected to a patient's "mouthpiece", or breathing mask (not shown) and the patient inhales, the central thin disk valve 18′ flexes as seen in dotted lines in the drawing, and air (or oxygen or other gas) is drawn in through the inhalation tube 11′, 10′ and through the opening 14′, past the valve 18′ into the patient's lungs without resistance or back pressure.

During exhalation the valve 18′ closes as the breath from the patient passes through the tube 2′, through the cap and the annular exhalation ports or passages 17′, flexing the ring flap valve 16′ outwardly, and passes into the larger exhalation chamber in the casing 5′ that surrounds the inhalation tube 10′ and is freely exhausted through the outwardly and rearwardly inclined exhalation passages 24′ where it can be collected, if desired.

While a particular embodiment of the invention has been shown and described, it is understood that the invention is not to be restricted thereto and all modifications are intended to be covered which would be apparent to one skilled in the art to which the invention relates, and which comes within the scope of the appended claims.

I claim:

1. A respiratory inhalation and exhalation valve structure comprising an annular casing having a central axis and a closed end, a cap closing the other end of the casing, a respiratory inhalation and exhalation tube extending through the cap in concentric aligned relation to said axis of the casing, an inhalation and exhalation valve plate fixedly disposed across said other end of said casing clamped between said casing and said cap, normal to the axis of said casing and said inhalation-exhalation tube, said valve plate having an inhalation port therethrough concentric to said casing axis having an area substantially equal to the inner cross-sectional area of said inhalation-exhalation tube, an inhalation tube extending through said closed end of said casing to said valve plate in concentric aligned relation to said inhalation-exhalation tube and to said inhalation port, and having an inner cross-sectional area substantially equal to said area of inhalation port in said valve plate, said casing having an annular exhalation space concentrically surrounding said inhalation tube, and extending between said valve plate and said closed end of said casing having a cross-sectional area substantially equal to said cross-sectional area of said inhalation tube, said valve plate having an annular circular exhalation port therethrough concentrically surrounding said inhalation port having an exhalation area substantially equal to the area of said inhalation port and opening into said exhalation space, a thin flexible circular valve disk movable between said plate and said cap in concentric relation to said inhalation port, for closing said inhalation port during exhalation, and an annular thin flat ring-like flexible exhalation flap valve for closing said exhalation port during inhalation, concentrically surrounding said inhalation port tube and having its annular inner edge portion clamped in said casing between the inner end of said inhalation tube and said valve plate, and located intermediate the valve plate and the closed end of said casing.

2. A respiratory inhalation and exhalation valve structure comprising an annular casing having a closed end, a cap closing the other end of said casing, an inhalation and exhalation valve plate fixed between said casing and said cap having a central inhalation port therethrough and an annular exhalation port therethrough surrounding said inhalation port in closely spaced concentric relation thereto, and inhalation and exhalation passage extending through said cap normal to said valve plate, in aligned concentric relation to said inhalation port in said valve plate, an inhalation tube extending through said closed end of said casing in aligned concentric relation to said inhalation port and said inhalation passage having an inner end disposed in close surrounding relation to said inhalation port, to provide an aligned inhalation passage through said casing, plate and cap, an annular substantially thin flat flap valve fixed around its annular inner edge portion between the inner end of said inhalation tube and the face of said valve plate between the inhalation port and the surrounding exhalation port in said valve plate and extending outwardly to cover and close said exhalation port during inhalation through said inhalation port, and flex outwardly away from said valve plate to uncover said exhalation port during exhalation through said inhalation and exhalation port in said cap, said casing having an annular exhalation chamber surrounding said inhalation tube in communication with said surrounding exhalation port in said valve plate when said exhalation valve is opened during exhalation, a thin substantially flat circular flexible inhalation valve concentrically fixed at its center relative to the center of said inhalation port to cover and close said inhalation port during exhalation and flex outwardly toward said cap during inhalation to uncover said inhalation port, an exhalation tube opening out of said casing away from said surrounding exhalation chamber.

3. A respiratory inhalation and exhalation valve structure as set forth in claim 2 in which said cap and said casing are removably secured together in concentric aligned relation and said valve plate is clamped in position between the casing and said cap when the same are secured together.

4. A respiratory inhalation valve structure as set forth in claim 3 in which the annular substantially thin flat flap valve is clamped around its inner annular edge portion between the adjacent face of the valve plate intermediate the inhalation and exhalation ports therein and the inner end of the inhalation tube to isolate the inhalation tube from the surrounding exhalation chamber.

5. An inhalation-exhalation valve structure as set forth in claim 2 in which the valve plate comprises an outer annular rim clamped between the casing and the cap forming a seat for the periphery of the annular exhalation valve, an annular intermediate ring supported by said outer annular rim disposed in aligned concentric relation to the end of the inhalation tube for receiving the inner edge portion of the annular exhalation valve thereon between the plate and the end of the inhalation tube, and comprising a seat for the periphery of the inhalation valve, and a central hub supported from the intermediate ring for supporting concentrically said circular inhalation valve on said plate at its center.

6. A valve structure as set forth in claim 2 in which the cross-sectional areas of said inhalation tube, inhalation port, and inhalation-exhalation tube are substantially equal, and the cross sectional exhalation area of the exhalation chamber and the exhalation passage from said exhalation chamber is at least equal to the cross-section of said inhalation area.

7. A respiratory valve structure as claimed in claim 5 in which the interior of said casing flares outwardly from said rim of said valve plate to said closed end to form an outwardly and rearwardly expanding exhalation chamber surrounding said inhalation tube, expanding rearwardly from said valve plate toward said closed end, and said closed end is formed with relatively spaced exhalation openings therethrough laterally spaced from said inhalation tube, having their axes inclining outwardly and rearwardly away from said closed end of said casing having a combined exhalation area at least equal to the exhalation area of said exhalation port in said valve plate.

8. A respiratory valve structure as set forth in claim 6 in which an exhalation-inhalation tube concentrically fixed in said cap projects outwardly from said cap, and said inhalation tube concentrically disposed in said casing is fixed in said closed end and projects rearwardly in concentric aligned relation to the exhalation tube materially beyond the outer surface of the closed end of said casing.

References Cited
UNITED STATES PATENTS 3,232,304   2/1966   Koester.
3,285,267   11/1966  Groth _____ 137—102

HAROLD W. WEAKLEY, Primary Examiner

U.S. Cl. X.R.

137—512.15, 525